United States Patent
Cotter et al.

[19]

[11] Patent Number: 6,065,588
[45] Date of Patent: May 23, 2000

[54] CONTACT ASSEMBLY FOR ACCUMULATION CONVEYORS

[75] Inventors: David H. Cotter, Coopersville; Ronald C. Ehlert, Wyoming; Thomas J. Pelak, Grand Rapids; Kenneth J. Kooistra, Byron Center, all of Mich.

[73] Assignee: Mannesmann Dematic Rapistan Corp., Grand Rapids, Mich.

[21] Appl. No.: 09/110,113

[22] Filed: Jul. 2, 1998

[51] Int. Cl.⁷ .................................................. B65G 13/06
[52] U.S. Cl. .............................. 198/781.06; 198/781.09
[58] Field of Search ..................... 198/781.06, 781.09, 198/781.1, 781.11, 790

[56] References Cited

U.S. PATENT DOCUMENTS

| | | | |
|---|---|---|---|
| 1,192,832 | 7/1916 | Sherman | 98/416 |
| 1,292,178 | 1/1919 | Waterman | |
| 1,321,303 | 11/1919 | Haldeman | 198/415 |
| 1,487,000 | 3/1924 | Williams | |
| 1,883,889 | 10/1932 | Farley | 198/416 |
| 1,929,707 | 10/1933 | Mojonnier | 198/137 |
| 2,190,418 | 2/1940 | Davidson et al. | 271/52 |
| 2,566,417 | 9/1951 | Holm | 198/31 |
| 2,586,523 | 2/1952 | Dudley, Jr. | 198/30 |
| 2,706,034 | 4/1955 | Russell et al. | 198/204 |
| 2,848,096 | 8/1958 | Luginbuhl | 198/36 |
| 3,240,311 | 3/1966 | Hofer et al. | 198/34 |
| 3,241,651 | 3/1966 | Colby | 198/31 |
| 3,255,865 | 6/1966 | Sullivan | 198/127 |
| 3,306,430 | 2/1967 | Fogg | 198/127 |
| 3,420,355 | 1/1969 | Degood et al. | 198/127 |
| 3,420,356 | 1/1969 | DeGood | 198/127 |
| 3,451,527 | 6/1969 | Leach | 198/127 |
| 3,458,026 | 7/1969 | Lauzon et al. | 198/34 |
| 3,458,339 | 7/1969 | Miller et al. | 198/34 |
| 3,502,197 | 3/1970 | Takeo Kato et al. | 198/127 |
| 3,508,642 | 4/1970 | Standley et al. | 198/204 |
| 3,527,336 | 9/1970 | Johnston | 198/127 |
| 3,580,379 | 5/1971 | Shuster et al. | 198/31 AB |
| 3,601,240 | 8/1971 | Dominici | 198/20 |
| 3,610,396 | 10/1971 | Babunovic | 198/30 |
| 3,612,247 | 10/1971 | Pipp | 198/37 |
| 3,612,248 | 10/1971 | Wallis | 198/37 |
| 3,637,066 | 1/1972 | Idskov et al. | 198/38 |
| 3,643,789 | 2/1972 | Werntz | 198/127 |
| 3,666,077 | 5/1972 | Marshall | 198/29 |
| 3,724,642 | 4/1973 | DeGood | 198/127 R |
| 3,730,330 | 5/1973 | DeGood | 198/127 R |
| 3,768,630 | 10/1973 | Inwood et al. | 198/127 R |
| 3,770,102 | 11/1973 | DeGood | 198/127 R |
| 3,840,109 | 10/1974 | Kohl | 198/127 |
| 3,854,576 | 12/1974 | Bowman | 198/184 |
| 3,866,739 | 2/1975 | Sikorski | 198/30 |
| 3,880,298 | 4/1975 | Habegger et al. | 214/11 R |
| 3,895,706 | 7/1975 | Levin et al. | 198/127 R |
| 3,973,672 | 8/1976 | Frost | 198/283 |
| 3,980,172 | 9/1976 | DeGood | 198/781 |

(List continued on next page.)

FOREIGN PATENT DOCUMENTS

| | | | |
|---|---|---|---|
| 198228 | 3/1986 | European Pat. Off. | |
| 727372 | 8/1996 | European Pat. Off. | |
| 2248216 | 5/1975 | France | 198/437 |
| 0519810 | 2/1931 | Germany | 271/52 |
| 9214827 | 10/1992 | Germany | 13/71 |
| 0203023 | 9/1986 | Japan | 198/436 |

*Primary Examiner*—Jospeh E. Valenza
*Attorney, Agent, or Firm*—Van Dyke, Gardner, Linn & Burkhart, LLP

[57] ABSTRACT

A contact assembly for an accumulation conveyor includes a support member having a cavity dimensioned to receive a force producing device. A contact member is positioned between the force producing device and the conveying rollers and reciprocates with respect to the conveying rollers. The contact member includes a platform which supports a pair of cantilevered contact rollers journaled at opposing ends of the platform. When the platform is vertically reciprocated by the force-producing device, the contact rollers in driving engagement with a drive belt are forced upward, placing the drive belt into driving contact with the conveying rollers.

47 Claims, 8 Drawing Sheets

U.S. PATENT DOCUMENTS

| | | | |
|---|---|---|---|
| 4,039,074 | 8/1977 | Maxted | 198/456 |
| 4,044,897 | 8/1977 | Maxted | 214/11 R |
| 4,054,199 | 10/1977 | Polderman | 198/452 |
| 4,054,201 | 10/1977 | Rollinger | 198/455 |
| 4,074,805 | 2/1978 | Bodewes | 198/790 |
| 4,088,224 | 5/1978 | Kittredge | 198/781 |
| 4,103,769 | 8/1978 | Jorgensen | 198/781 |
| 4,108,304 | 8/1978 | McKnight et al. | 198/781.09 |
| 4,219,115 | 8/1980 | Moore | 198/781 |
| 4,221,288 | 9/1980 | Rae | 198/781 |
| 4,223,780 | 9/1980 | Saur | 198/781 |
| 4,252,234 | 2/1981 | Brouwer | 198/790 |
| 4,264,002 | 4/1981 | Van Der Schie | 198/365 |
| 4,273,239 | 6/1981 | Thwaites et al. | 198/781 |
| 4,284,186 | 8/1981 | Brouwer | 198/415 |
| 4,293,065 | 10/1981 | Dyer et al. | 198/781 |
| 4,301,914 | 11/1981 | Krammer | 198/781 |
| 4,308,946 | 1/1982 | Ouellette | 198/790 |
| 4,311,231 | 1/1982 | Milazzo | 198/781 |
| 4,318,468 | 3/1982 | Bodewes et al. | 198/781 |
| 4,361,224 | 11/1982 | Bowman | 198/781 |
| 4,361,225 | 11/1982 | Saur | 198/781 |
| 4,372,441 | 2/1983 | Krammer et al. | 198/781 |
| 4,441,607 | 4/1984 | Bowman et al. | 198/781 |
| 4,458,809 | 7/1984 | White et al. | 198/790 |
| 4,489,820 | 12/1984 | Schneider | 198/448 |
| 4,502,593 | 3/1985 | Van den Goor | 198/781 |
| 4,562,921 | 1/1986 | Leemkuil et al. | 198/841 |
| 4,570,780 | 2/1986 | Thwaites et al. | 198/781 |
| 4,640,409 | 2/1987 | Holtman | 198/624 |
| 4,708,234 | 11/1987 | Born et al. | 198/453 |
| 4,721,203 | 1/1988 | Kimball et al. | 198/781 |
| 4,832,184 | 5/1989 | Degood | 198/781 |
| 4,854,445 | 8/1989 | Eaton et al. | 198/781 |
| 4,863,012 | 9/1989 | Nord et al. | 198/781 |
| 4,889,224 | 12/1989 | Denker | 198/382 |
| 4,919,256 | 4/1990 | Gebhardt | 198/781 |
| 4,942,957 | 7/1990 | Bonifer et al. | 198/781 |
| 5,082,109 | 1/1992 | Blondeau | 198/781 |
| 5,101,958 | 4/1992 | LeMay et al. | 198/436 |
| 5,147,023 | 9/1992 | Meindl | 198/454 |
| 5,191,967 | 3/1993 | Woltjer et al. | 198/781 |
| 5,240,101 | 8/1993 | LeMay et al. | 198/443 |
| 5,244,081 | 9/1993 | Kajii et al. | 198/790 |
| 5,311,979 | 5/1994 | Risley et al. | 198/453 |
| 5,348,139 | 9/1994 | Szarkowski et al. | 198/781 |
| 5,540,323 | 7/1996 | Schiesser et al. | 198/781.06 |
| 5,575,220 | 11/1996 | Van Soest et al. | 105/163.1 | they may disrupt the movement of product along the conveyor. Moreover, this frictional resistance causes excessive wear on the endless drive member and thus reduces its economic life. Additionally, for any given conveyor speed, the drive motor must compensate for belt pull and therefore energy costs are increased.

CONTACT ASSEMBLY FOR ACCUMULATION CONVEYORS

BACKGROUND OF THE INVENTION

The invention relates generally to accumulation conveyors and, more particularly, to pneumatically actuated accumulation conveyors.

Accumulation conveyors normally include a pair of support rails placed a preselected distance apart. These support rails receive a plurality of transversely positioned product or conveying rollers. The conveying rollers support product being conveyed and when rotated, transport the same in a particular direction. Positioned below the conveying rollers is an endless drive member, such as a conveyor belt, which is driven by a drive motor. The accumulation conveyor system is normally divided into a plurality of zones. Each zone of the conveyor is equipped with a product sensor for detecting the presence or absence of product at a particular position along the conveyor. Each of these sensors is operationally connected to a contact assembly attached to one or both of side rails positioned below the top run of the endless drive member. Each contact assembly includes a pneumatically or mechanically driven vertically reciprocal contact member which may be operationally interconnected with contact assemblies positioned in other zones of the conveyor.

In accordance with a particular control scheme dictating the selective movement of product along the conveyor, one or more of the contact assemblies are actuated to move the contact member into frictional contact with the endless drive member. When a particular contact member is in such frictional engagement with the endless drive member, the conveying rollers adjacent the control assembly are engaged by the top surface of the top run of the endless drive member and begin to rotate. This rotation in turn results in the transportation of product supported by the selected conveying rollers.

When it is desired to accumulate product within a particular zone of the conveyor, a signal is sent to the contact assembly within that zone. Receipt of this signal causes the vertical retraction of the contact member and hence moves the same out of driving engagement with the endless drive member. This in turn results in the disengagement of the top surface of the endless drive member from contact with the conveying rollers and thus, such conveying rollers cease rotation.

One area in which existing accumulation conveyors often experience inefficiencies is with the vertically reciprocal contact assemblies. When the contact member is placed in engagement with the lower surface of the top run of the endless drive member, excessive "belt pull" is often encountered. That is, due to the engagement of the top surface of the contact member with the endless drive member, the drive member encounters frictional resistance in a direction opposite to the direction of motion. This frictional resistance, or belt pull reduces the rotational efficiency of the conveying rollers and may disrupt the movement of product along the conveyor. Moreover, this frictional resistance causes excessive wear on the endless drive member and thus reduces its economic life. Additionally, for any given conveyor speed, the drive motor must compensate for belt pull and therefore energy costs are increased.

When the contact member of the contact assembly is placed in engagement with the endless drive member, the contact member absorbs vertical forces. Due to the particular structural configuration of these contact members, such vertical forces impose moments upon certain areas of the contact member. Over time, these forces may cause the structural deformation of the contact member. This in turn increases the frequency and cost of maintenance. Also, structural deformation of the contact member precludes uniform contact of the endless drive member with the conveying rollers. Uneven contact between the drive member and the conveying rollers reduces the efficiency of the accumulation conveyor, and frequently results in one or more "dead rollers," i.e. a conveying roller which is not properly engaged by the drive member.

Many accumulation conveyors have the endless drive member positioned in proximity to one of the supporting side rails. Consequently, most existing contact assemblies are dedicated to accumulation conveyors having the endless drive member positioned near one side support rail or the other and can not be adapted to operate on the opposing side of the conveyor. Lack of adjustability of the contact assemblies to be used in conjunction with accumulation conveyors having the drive member on one side or the other increases manufacturing costs. Furthermore, existing contact assemblies are often composed of a variety of different components that are both difficult to manufacture, and expensive to replace.

Therefore, there exists a need for a contact assembly for an accumulation conveyor which overcomes the difficulties of the prior art while being exceptionally functional and economical to manufacture.

SUMMARY OF THE INVENTION

According to an aspect of the invention, an accumulation conveyor includes a contact assembly having a support member mounted to one of the support rails of the accumulation conveyor. The support member supports a force producing device. A contact member is positioned on the support member and is in operable connection with the force producing member, thereby allowing vertical reciprocation of the contact member with respect to the support member. A pair of contact rollers are attached to the contact member, each of which is positioned beyond an end of the contact member. When actuated by the force producing member, the contact rollers in contact with the drive member of the accumulation conveyor are brought into contact with, and affect the rotation of, the conveying rollers positioned above the drive member. The use of these contact rollers significantly reduces belt pull and consequently increases the economic life of the drive member while significantly reducing the energy requirements necessary to drive the accumulation conveyor at a particular speed.

According to another aspect of the invention, the contact member includes a pair of arms attached to respective sides and extending in opposite directions beyond a respective end of the contact member. The end of each arm is formed with a shaft to which a contact roller is journaled. Each contact roller is cantilevered to its shaft. When the cantilevered contact rollers are placed in contact with the endless drive member, each cantilevered contact roller produces a moment about the arm to which it is journaled. Since the arms are positioned on opposing sides of the contact member and extend in opposite directions, the moment produced by the respective rollers is canceled. This cancellation of moments in turn increases the stability of the contact assembly, assures an even application of force upon the endless drive member, and avoids structural deformation, and hence maximizes the viable period with which the contact assembly can be used. Additionally, because the contact rollers are cantilevered at opposing ends, the rollers center the endless drive member when in contact therewith, thereby avoiding misalignment and thus providing uniform engagement with the conveying rollers.

According to yet another aspect of the invention, the ends of the contact rollers are formed with an out-turned flanges. These flanges serve to maintain the alignment of the drive member and therefore assures proper frictional contact between the drive member and the conveying rollers.

According to still yet another aspect of the present invention, the support member, the contact member and the contact rollers are each formed from a single polymeric molding process. The ability to manufacture the contact assembly from a minimum number of forming processes greatly reduces the cost of manufacturing, while providing a contact assembly with exceptional durability and reliability.

These and other objects, advantages and features of this invention will become apparent upon review of the following specification in conjunction with the drawings.

DESCRIPTION OF THE PREFERRED EMBODIMENTS

The present invention overcomes the difficulties confronted by the prior art by providing a contact assembly which is durable, reliable and economic to manufacture. The present invention finds particular application as a contact assembly for use in conjunction with the conveyor set forth in the commonly assigned U.S. Pat. No. 5,540,323 issued to Schiesser et al. for a MODULAR PNEUMATIC ACCUMULATION CONVEYOR, the disclosure of which is hereby incorporated herein by reference.

Figure 1:
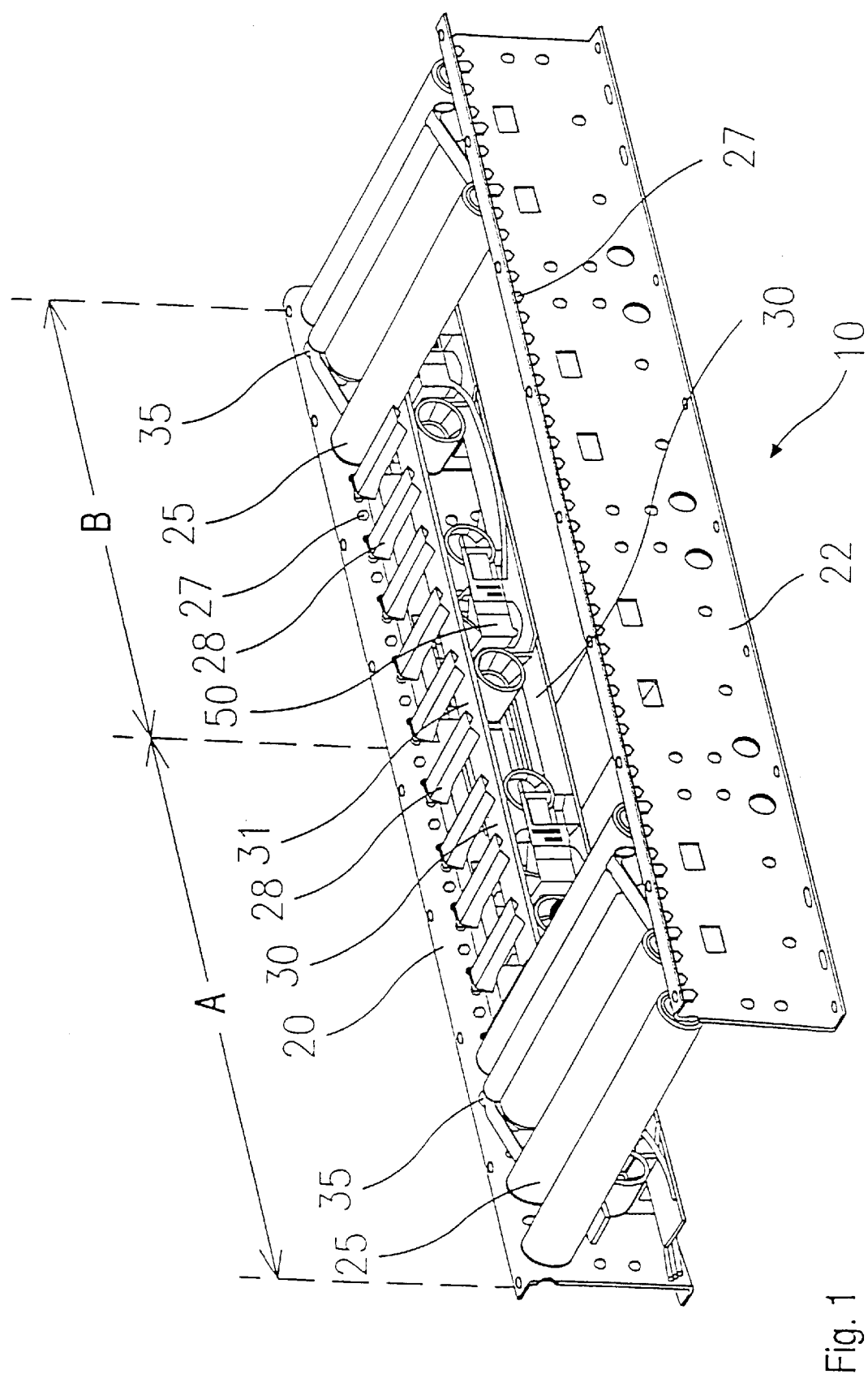
FIG. 1 is a perspective view of a segment of an accumulation conveyor according to the invention.
Figure 2:
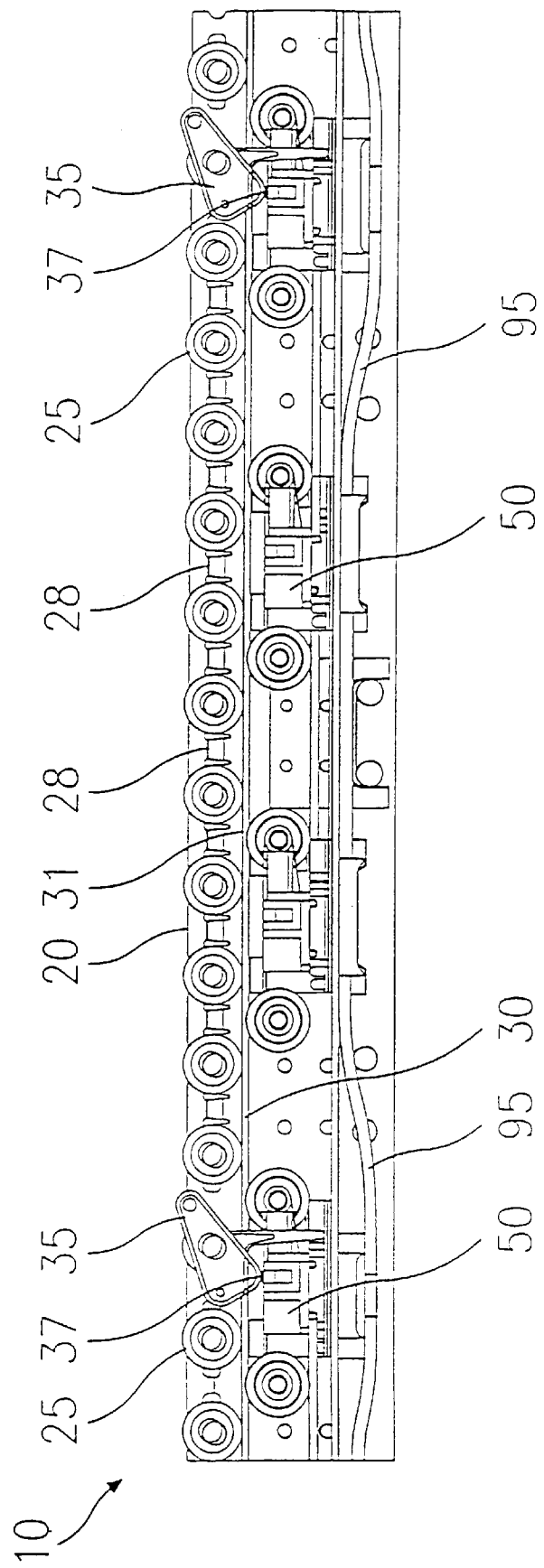
FIG. 2 is side elevation of the accumulation conveyor segment of FIG. 1.

Referring now specifically to FIGS. 1 and 2, an accumulation conveyor 10 normally includes a pair of side support rails 20 and 22. Side rails 20 and 22 are joined by cross members (not shown) positioned at longitudinally spaced intervals. A plurality of rotatably mounted conveying rollers 25 extend between side rails 20 and 22 along the entire length of accumulation conveyor 10. Conveying rollers 25 define a conveying surface upon which product is transported. Conveying rollers 25 are captured within hexagonal holes 27 formed in side rails 20 and 22. Conveying rollers 25 are placed a preselected distance apart, preferably on three inch centers. When so positioned, finger guards 28 may be provided between adjacent conveying rollers 25 in order to provide protection against a user engaging the moving components of accumulation conveyor 10. Finger guards 28 are captured within hexagonal holes 27 formed in side rails 20 and 22.

Accumulation conveyor 10 is divided into a plurality of zones. In FIG. 1, only zone A and zone B are illustrated, however it will be appreciated by those with ordinary skill in the art that accumulation conveyor 10 may have any number of zones. An endless drive member, such as drive belt 30, provides the mechanical force for driving conveying rollers 25. Drive belt 30 is driven by a drive assembly (not shown) which imparts motion upon drive belt 30 in a preselected direction. As shown, drive belt 30 is positioned in proximity to support side rail 20. However, it will be recognized that drive belt 30 may also be positioned in proximity to side support rail 22. Each zone of accumulation conveyor 10 includes at least one contact assembly 50 juxtaposed with the upper portion 31 of drive belt 30 beneath conveying rollers 25. Each contact assembly 50 is adapted to bring upper portion 31 of drive belt 30 into driving engagement with conveying rollers 25 located immediately above the particular contact assembly 50. A product sensor 35 is provided for each zone of accumulation conveyor 10 in order to operatively control the contact assembly or assemblies 50 for that zone, in accordance with a preselected control scheme. Each product sensor 35 operatively engages an actuator 37, normally a pneumatic valve, which controls the vertically reciprocative movement of the contact assembly 50. The details of product sensor 35, actuator valve 37, and the control scheme by which they are operated is set forth in detail in U.S. Pat. No. 5,540,323, which has hereinabove been incorporated by reference. It will be recognized by those with ordinary skill in the art that there exists a variety of product sensors and actuators, any of which may be substituted for a product sensor 35 and actuator valve 37 without departing from the spirit and scope of the present invention. An example of an alternative product sensor includes photodetectors.

Figure 3:
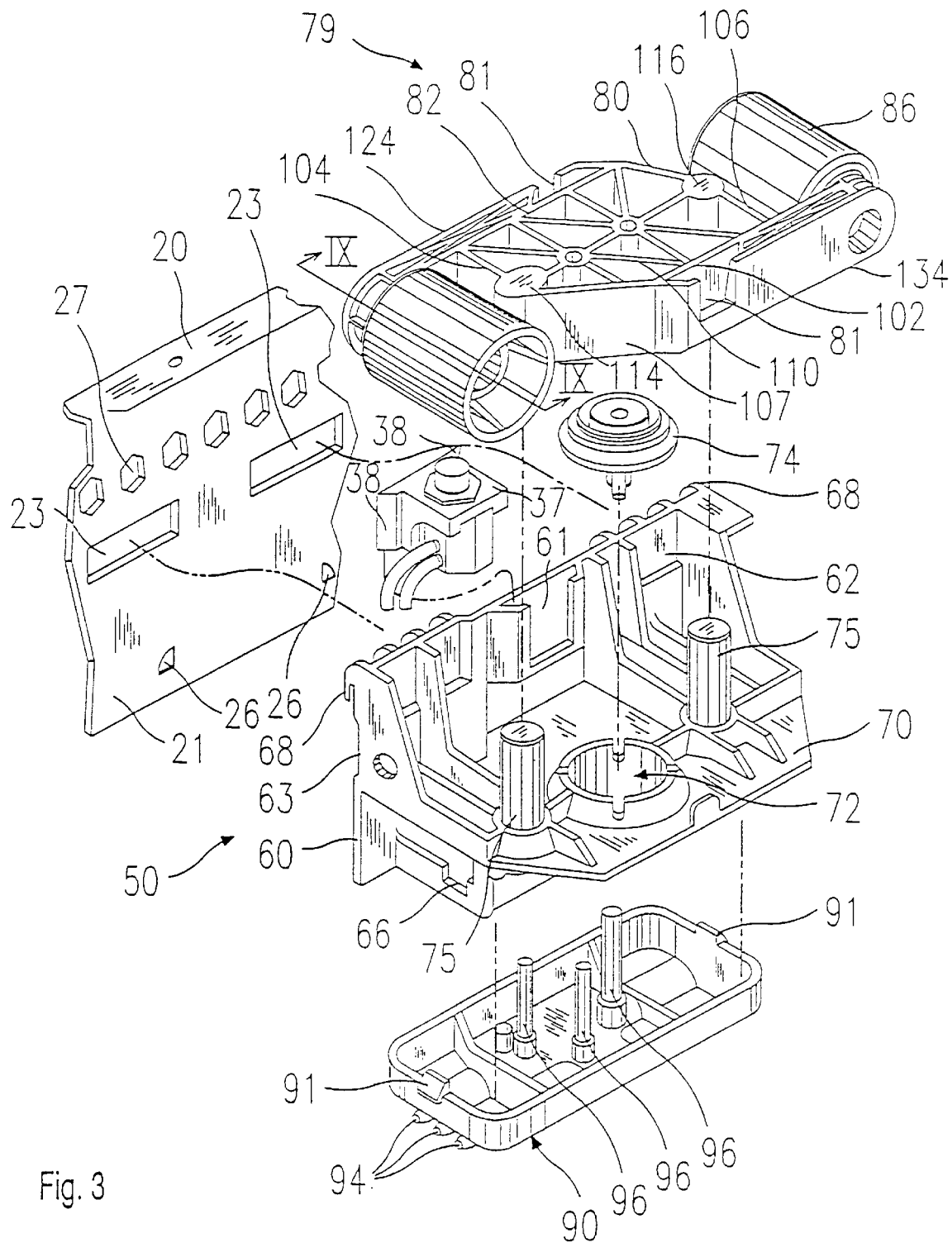
FIG. 3 is an exploded perspective view of a contact assembly according to the invention.
Figure 4:
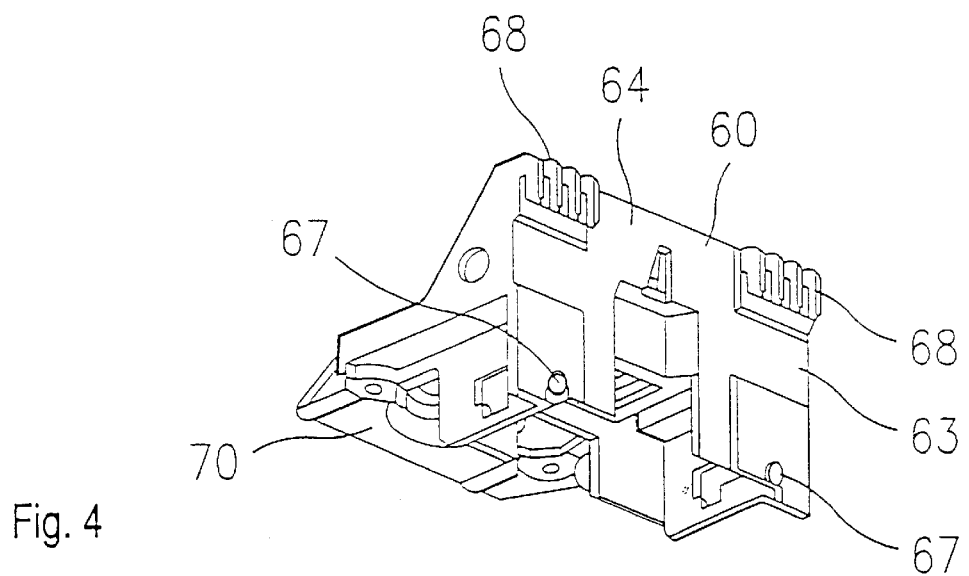
FIG. 4 is rear perspective view of a support member of the contact assembly of FIG. 3.

Referring now specifically to FIGS. 3 through 12, and the illustrative embodiments depicted therein, contact assembly 50 includes a support member 60 which is mounted to side support rail 20 of accumulation conveyor 10 by a pair of integrally formed hook and snap fasteners 68. Hook and snap fasteners 68 extend from the top region of rear surface 63 of back 64 and are received by cut-out sections 23 formed in side support rail 20. As shown in FIG. 4, a pair of pins 67 extend from bottom region of rear surface 63 of back 64. Pins 67 are received by holes 26 formed in side support rails 20 and 22. Preferably, pins 67 are D-shaped. Support member 60 includes a horizontal surface 70 extending from back 64. Horizontal surface 70 is formed having a cavity 72. Cavity 72 is configured to retainably receive a conventional fluid actuated force producing device, or pneumatic diaphragm 74 of the type normally employed in the industry. A pair of towers or guide members 75 extend substantially vertically from horizontal surface 70. Guide members 75 provide support for a contact member 79 enabling its vertical reciprocation with respect to support member 60.

Figure 5:
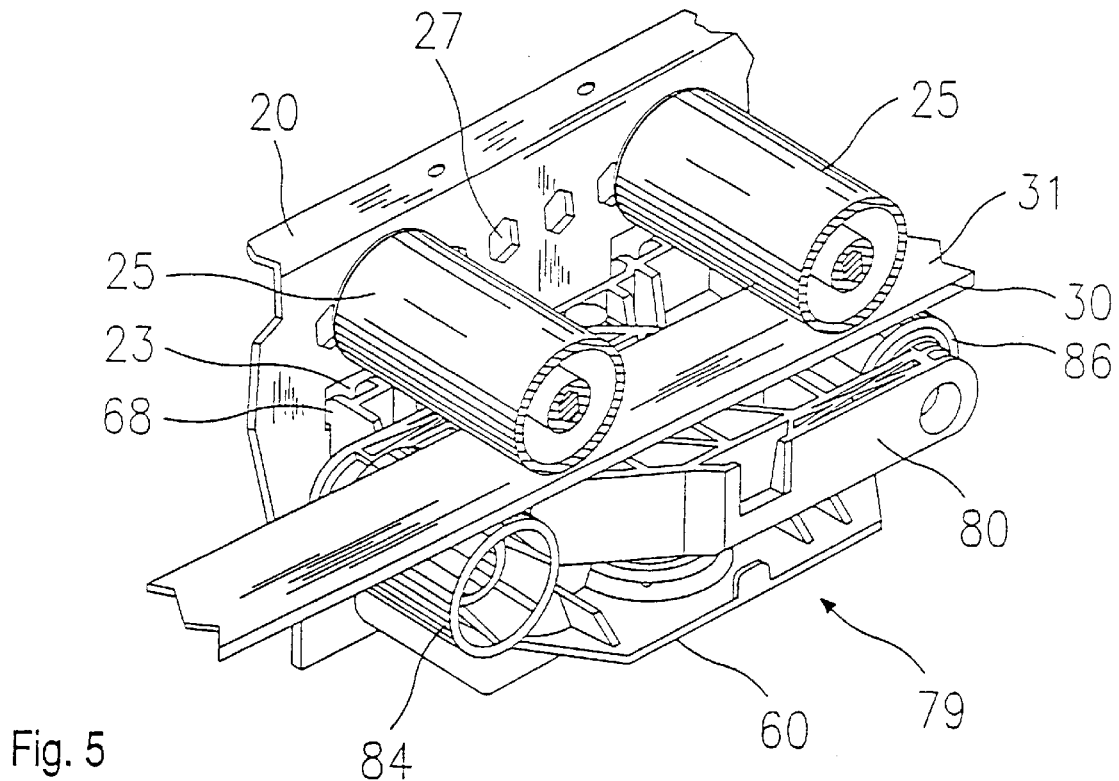
FIG. 5 is a perspective view of the contact assembly of FIG. 3 illustrated in a vertically extended position and in contact with the conveying rollers.
Figure 6:
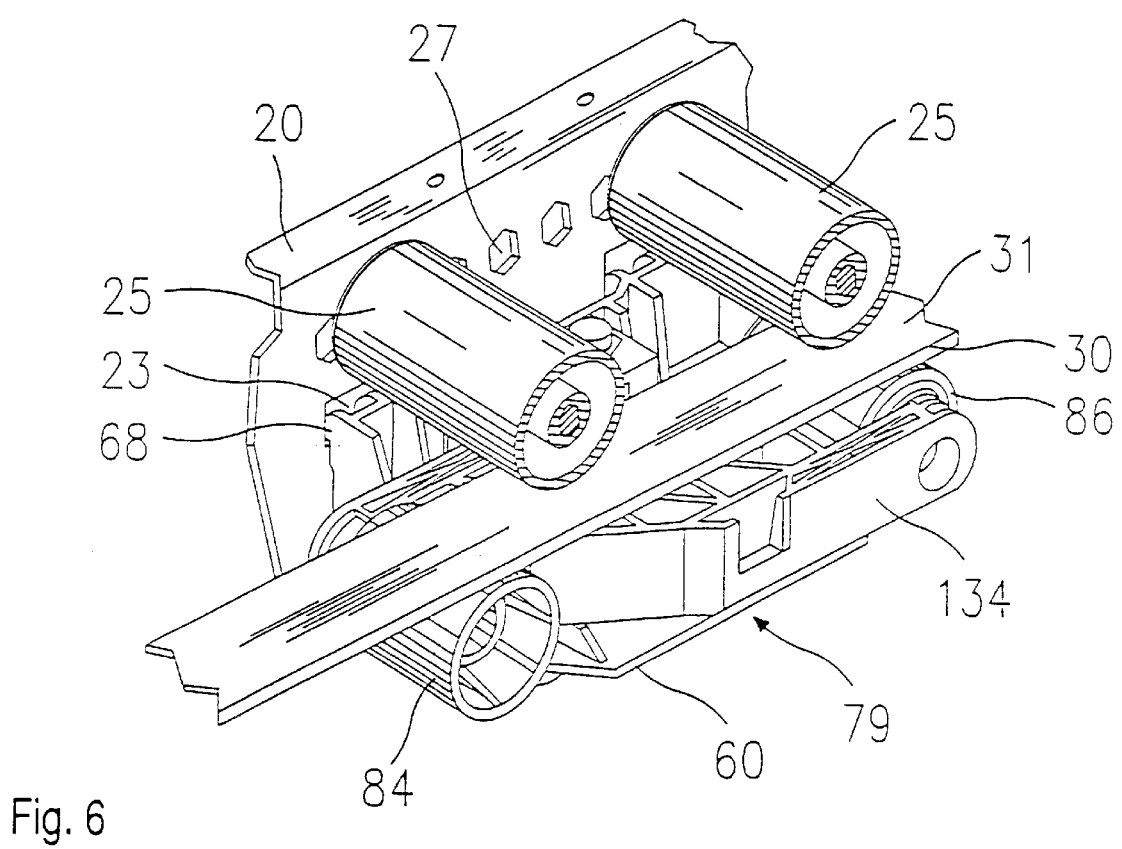
FIG. 6 is the same view as FIG. 5 illustrating the contact assembly in a vertically retracted position.

Contact member 79 includes a platform 80 having attached thereto a pair of contact rollers 84 and 86 which are removably placed into rotatable connection with upper portion 31 of drive belt 30. When diaphragm 74 is positioned within cavity 72 of support member 60, application of compressed air to diaphragm 74 will vertically reciprocate platform 82, causing contact rollers 84, 86 into rotational engagement with upper portion 31 of drive belt 30 (FIG. 5). This rotational engagement causes upper portion 31 of drive belt 30 to move in an upward direction and into driving engagement with conveying rollers 25 adjacent contact assembly 50. As illustrated in FIG. 6, deflation of diaphragm 74 moves platform 82 in vertically downward direction and thereby disengaging drive belt 30 from conveying rollers 25. Hence, conveying rollers 25 positioned adjacent thereto cease rotation. When drive belt 30 is disengaged from conveying rollers 25, drive belt 30 maintains contact with contact rollers 84, 86 and they therefore continue to rotate.

Figure 3A:
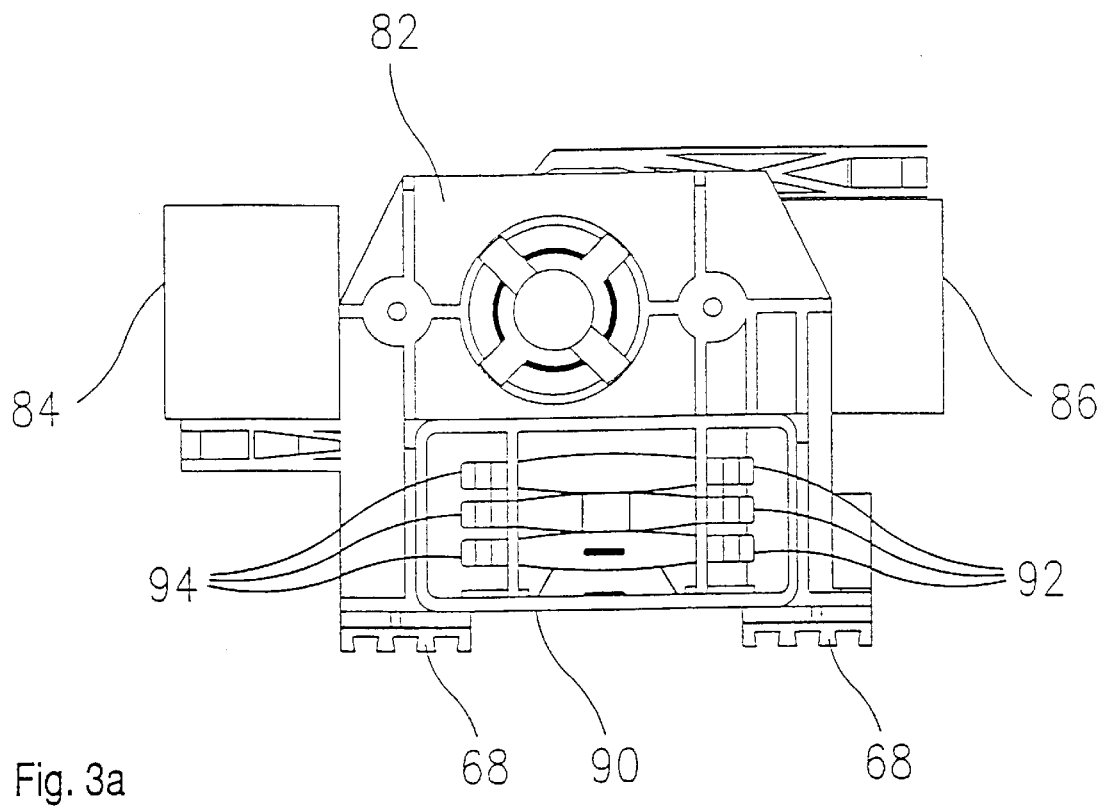
FIG. 3a is a bottom view of the contact assembly of FIG. 3.

Contact assembly 50 additionally includes a pneumatic block 90. A pair of clips 91 extend from the respective ends of pneumatic block 90 for snap retention with recesses 66 defined in support member 60, only one of which is shown in FIG. 3. Pneumatic block 90 is formed with three input ports 92 and three output ports 94 (See FIG. 3*a*). Input ports 92 and output ports 94 are interconnected with adjacent contact assemblies 50 by ribbon tubing 95 (See FIG. 2). Pneumatic block 90 also is formed with inner connect ports 96 for direct engagement with actuator valve 37 and pneumatic diaphragm 74 supported within cavity 72 of support member 60.

Figure 7:
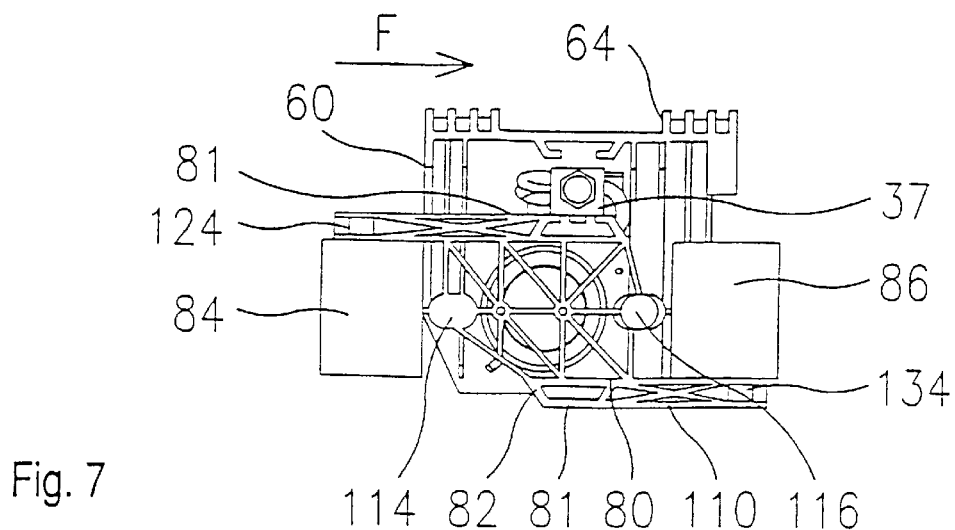
FIG. 7 is a top view of the contact assembly of FIG. 3 illustrating an actuator in an alternative position.

Depending upon the particular control scheme used in conjunction with contact assembly 50, actuator valve 37 may be positioned in a cavity 61 formed in front surface 62 of back 63. When actuator valve 37 is positioned within cavity 61, actuator 37 remains in a static position and does not reciprocate with contact member 80. Actuator 37 is formed with flanges 38 configured to be received by cavity 61. Alternatively, as shown in FIG. 7, depending upon the product sensor 35 used with contact assembly 50, actuator valve 37 may be positioned within a cavity 81 of a platform 80 of contact member 50. When positioned within cavity 81 of platform 80, actuator valve 37 moves concurrently with the movement of platform 80 when diaphragm 74 is actuated.

Figure 8:
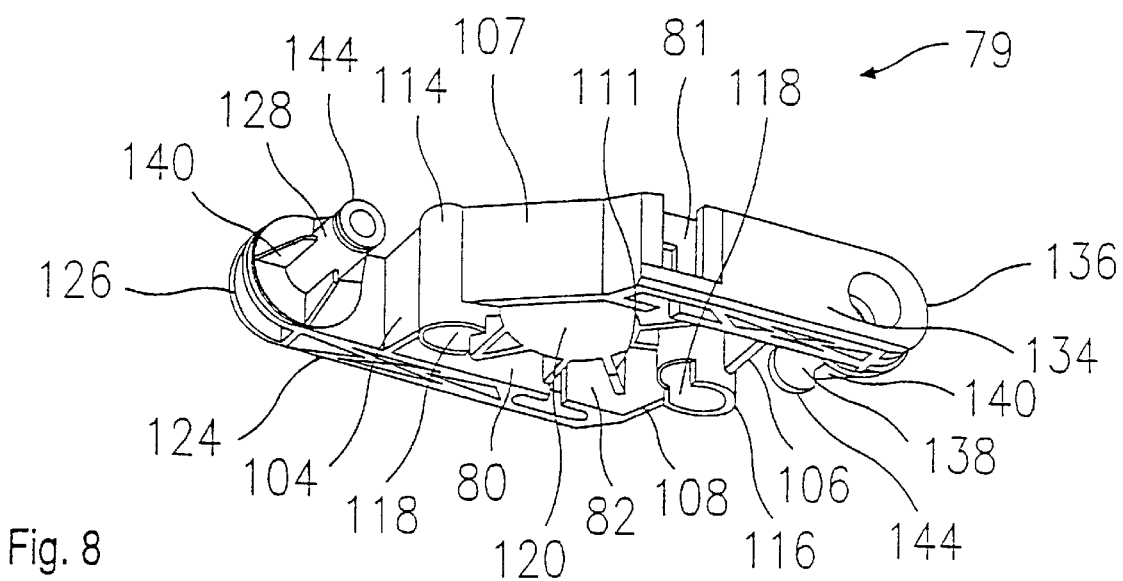
FIG. 8 is a perspective view of the contact member of the contact assembly of FIG. 3.
Figure 9:
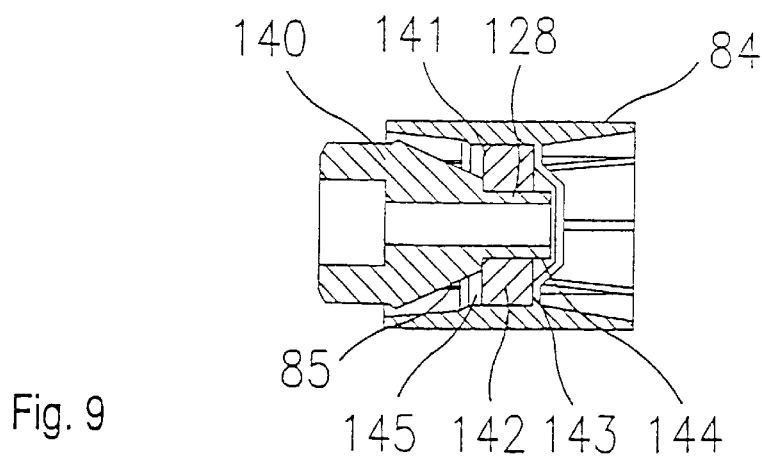
FIG. 9 is a sectional view of a contact roller journaled to a shaft taken along line IX—IX of FIG. 3.

Platform 80 of contact member 79 preferably has a hexagonal shape defined by opposing sides 100, 102, ends 104, 106 and angled segments 107 and 108. Side 100 and 102 are generally parallel as are ends 104 and 106. Platform 80 is formed with one or more cross supports or webbing 110 attached to the interior surfaces of platform 80. Webbing 110 serves to impart structural rigidity upon platform 80. Platform 80 is also formed with a pair of vertical posts 114 and 116. As shown in FIG. 8, posts 114 and 116 are each formed with a channel 118 dimensioned to receive a guide member 75 of support member 60. A generally circular plate 120 is formed upon bottom surface 120 of webbing 111. When platform 80 is positioned in support member 60, plate 120 is in registration with diaphragm 74 and provides a flat surface for contact with diaphragm 74.

Arm 124 extends from side 100 beyond end 104 of platform 80. Similarly, arm 134 extends from side 102 and beyond end 106 of platform 80. A horizontal shaft 128 extends from end 126 of arm 124. Analogously, a shaft 138 extends from end 136 of arm 134. As shown in FIG. 8, shaft 128 and shaft 138 extend in opposite directions. Contact rollers 84, 86 are journaled to respective shafts 128 and 138 in a cantilevered fashion. When journaled to shafts 128 and 138, the peripherally of contact rollers 84, 86 define a horizontal plane above the plane defined by the top of platform 80. This enables the periphery of contact rollers 84, 86 to rotationally engage upper portion 31 of drive belt 30.

Shafts 128 and 138 each are formed with a series of tapered flanges 140. As shown most clearly in FIG. 9, each contact roller 84, 86 contains an inner bore 83 which receives a single bearing 142. Shaft 128 or 138 is inserted within bearing 142. A retaining ring 144 is positioned about the periphery of shaft 128, 138 which engages surface 143 of bearing 142. Ends 141 of flanges 140 are positioned flush against surface 145 of bearing 142. Bearing 142 is held within bore 83 of contact roller 84, 86 by compression or friction fit customarily employed within the industry.

Since shafts 128 and 138 extend in opposite directions, contact rollers 84, 86 are journaled at opposite ends. Consequently, when contact rollers 84, 86 are placed in driving engagement with upper portion 31 of drive member 30, platform 80 experiences two separate moments generated by the downward force upon contact rollers 84, 86. Because rollers 84, 86 are journaled at opposite ends, these moments cancel one another. Cancellation of these moments imparts structural stability upon platform 80, and creates a centering effect upon upper portion 31 of belt 30. This centering effect in turn assures even contact between upper portion 31 of drive belt 30 and conveying rollers 25.

Figure 10:
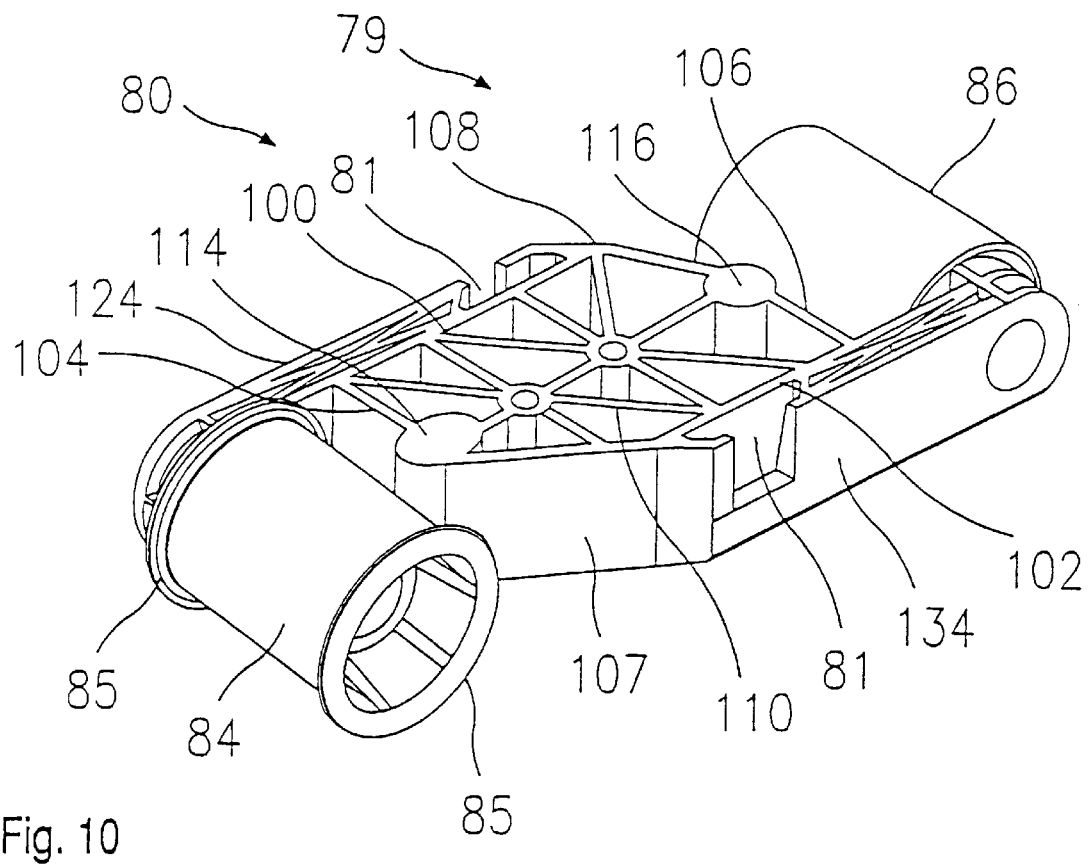
FIG. 10 is a perspective view of a contact member according to an alternative embodiment of the invention.

In a preferred embodiment, as shown in FIG. 10, one or both of contact rollers 84, 86 is formed with out turned flanges 85 formed at the respective ends of contact rollers 84, 86. FIG. 10 depicts only contact roller 84 as having flanges 85. However it will be recognized by those with ordinary skill in the art that both contact rollers 84, 86 may be formed with flanges 85 without departing from the spirit and scope of the present invention. Flanges 85 serve to maintain proper alignment of upper portion 31 of drive belt 30 when contact rollers 84, 86 are placed in driving engagement therewith.

In the most preferred embodiment, the distance between the center lines of shafts 128, 138 is approximately 6 inches with each contact roller 84, 86 having an approximate outer diameter of 1.75 inches. When so dimensioned, an accumulation conveyor 10 having conveying rollers 25 spaced on 3 inch centers permits contact assemblies 50 to be positioned such that each conveying roller 25 is driven by a particular contact roller 84, 86 of a particular contact assembly 50 as shown in FIG. 2. This arrangement in turn prevents the occurrence of one or more "dead rollers," i.e. where the upper portion 31 of drive belt 30 is not placed in driving engagement with a particular conveying roller 25.

Figure 11:
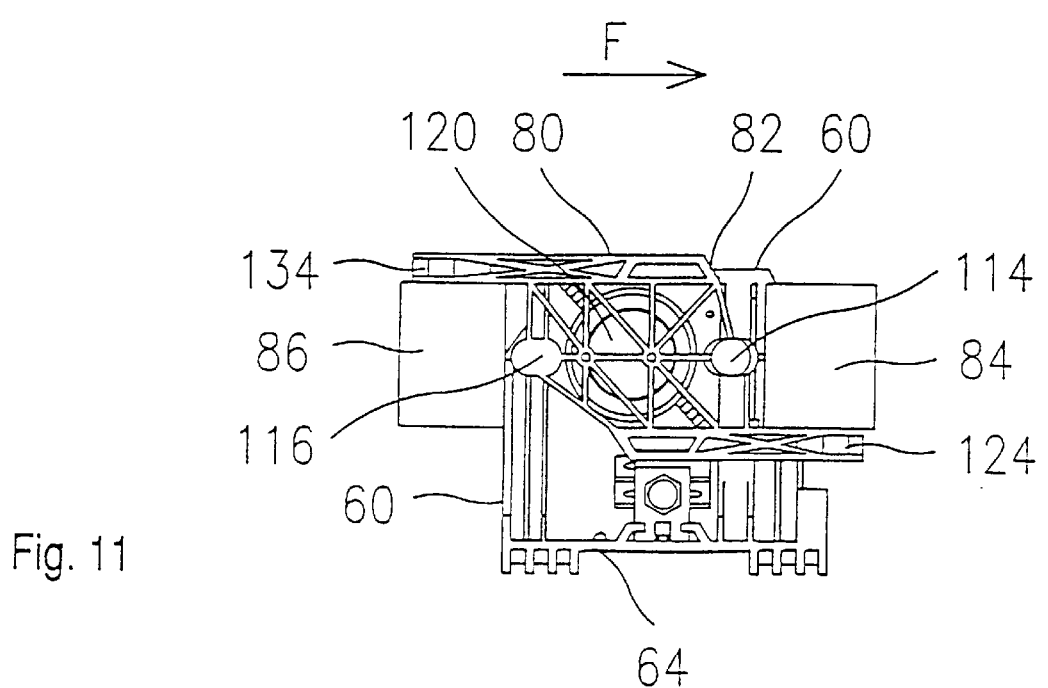
FIG. 11 is a top view of a contact assembly illustrating an alternative position of a contact member upon a support member.

As shown in FIGS. 1 and 2, contact assemblies 50 are secured to inner surface 21 of side support rail 20. However, it will be appreciated by those with ordinary skill in the art that contact assemblies 50 can also be used with accumulation conveyors having drive belt 30 positioned in proximity to opposing side support rail 22. As illustrated in FIG. 7, when the accumulation conveyor has a drive belt positioned in proximity to side support rail 20 with the flow of product going in the direction indicated by the directional arrow, platform 80 would be positioned on support member 60 such that arm 124 is positioned proximate to back 64 of support member 60. Alternatively, as shown in FIG. 11, if the accumulation conveyor has a drive belt positioned proximate to side support rail 22, platform 80 is positioned on support member 60 such that arm 134 is proximate to back 64 of support member 60. The reversal of position of platform 80 upon support member 60 depending upon the placement of drive belt 30 assures direct engagement between contact rollers 84, 86 of contact assembly 50 and conveying rollers 25 adjacent thereto. It should also be understood that contact assemblies 50 could be mounted to other conveyor structures, such as cross supports and the like.

Figure 12:
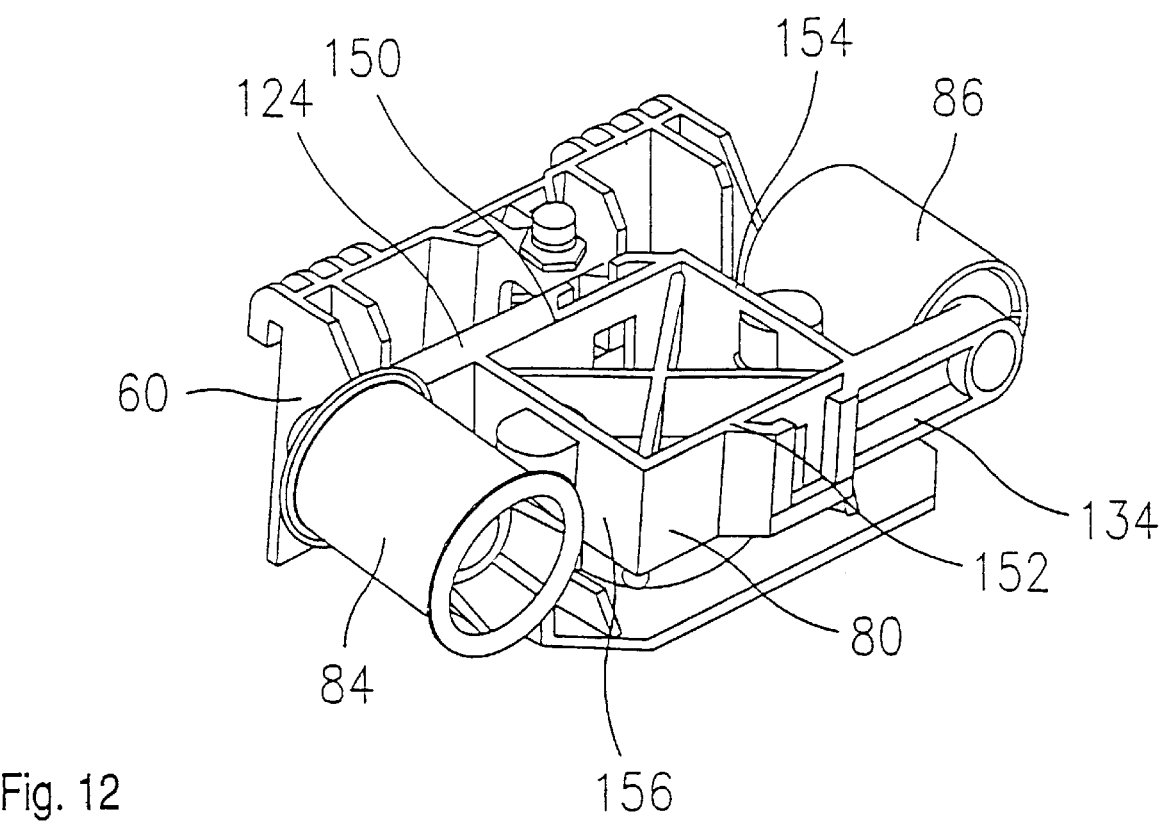
FIG. 12 is a perspective view of a contact assembly according to another alternative embodiment of the invention.

In an alternative embodiment, as depicted in FIG. 12, platform 80 assumes a square shape having opposing sides 150, 152 and opposing ends 154, 156, in contrast to the hexagonal shape described above. In all other respects, contact assembly 50 is identical to that described above.

Preferably, support member 60, contact member 79 and contact rollers 84, 86 are each manufactured of a polymeric material. Also, it is preferred that support member 60, contact member 79 and contact rollers 84, 86 are manufactured by a single forming process. In the most preferred embodiment, support member 60 and contact member 79 are formed of a glass filled polypropylene. Most preferably, the glass fibers are present in an amount of approximately 30% by weight. Also, in the most preferred embodiment, conveying rollers 84, 86 are formed of an acetal resin.

Other changes and modifications in the specifically described embodiments can be carried out without departing from the principles of the invention, which is intended to be limited only by the scope of the appended claims, as interpreted according to the principles of patent law including the doctrine of equivalents.

The embodiments of the present invention in which an exclusive property or privilege is claimed are defined as follows:

1. An accumulation conveyor comprising:
   a first and second spaced apart support rails, at least one cross member between said support rails, a plurality of conveying rollers supported by said support rails, and an endless drive member juxtaposed with said conveying rollers;
   a support member mounted to one of said first support rail, said second support rail and said cross member;
   a force-producing device carried by said support member; and
   a contact member positioned between said force-producing device and said conveying rollers, said contact member having a platform vertically reciprocated by said force-producing device, a first contact roller and a second contact roller attached thereto, said platform having a first end portion and a second end portion spaced apart at least the separation distance of said first and said second contact rollers, said first contact roller positioned beyond said first end portion of said platform, said second contact roller positioned beyond said second end portion of said platform, wherein actuation of said force-producing device moves said first contact roller and said second contact roller into engagement with said drive member and said drive member into engagement with said conveying rollers.

2. The accumulation conveyor as recited in claim 1, wherein said first contact roller and said second contact roller are cantilevered to said contact member.

3. The accumulation conveyor as recited in claim 1, wherein said platform has a first side and an opposing second side, a first shaft extending from said first side and beyond said first end portion, a second shaft extending from said second side and beyond said second end portion, said first contact roller cantilevered to said first arm, said second contact roller cantilevered to said second arm.

4. The accumulation conveyor as recited in claim 3, wherein said first arm has an end and said second arm has an end, said end of first arm having a first horizontal shaft extending therefrom, said first contact roller journaled in said first horizontal shaft, said end of said second arm having a second horizontal shaft extending therefrom, said second contact roller journaled in said second horizontal shaft, said first arm and said second arm extending in opposite directions.

5. The accumulation conveyor as recited in claim 3, wherein said platform further comprises a bottom, said bottom formed with a plate, said plate in registration with said force-producing device.

6. The accumulation conveyor as recited in claim 3, wherein said platform has an interior, said interior formed with at least one cross support.

7. The accumulation conveyor as recited in claim 1, wherein said support member has at least one guide member extending therefrom and said platform further comprises at least one vertical post dimensioned to receive said at least one guide member.

8. The accumulation conveyor as recited in claim 1, further comprising a pneumatic block mounted to said support member and interconnected with said force-producing device.

9. The accumulation conveyor as recited in claim 1, wherein said support member is mounted to a support rail of said pair of support rails.

10. The accumulation conveyor as recited in claim 1, wherein said first contact roller has a first end and a second end, said first end and said second end of said first contact roller formed with a flange.

11. The accumulation conveyor as recited in claim 10, wherein said second contact roller has a first end and a second end, said first end and said second end of said second contact roller formed with a flange.

12. The accumulation conveyor as recited in claim 1, wherein said support member and said contact member are made of a polymeric material.

13. The accumulation conveyor as recited in claim 1, wherein said support member and said contact member are made of polypropylene having a preselected concentration of glass filler.

14. The accumulation conveyor as recited in claim 1, wherein said platform has a hexagonal shape.

15. The accumulation conveyor as recited in claim 1 wherein said first and said second contact rollers are made of an acetal resin.

16. A contact assembly for an accumulation conveyor having first and second spaced apart support rails, at least one cross member between said support rails, a plurality of conveying rollers supported by the support rails, and an endless drive member juxtaposed with the conveying rollers, said contact assembly comprising:
   a support member mounted to one of said first support rail, said second support rail and said cross member;
   a force-producing device carried by said support member; and
   a platform positioned between said force-producing device and the conveying rollers, said platform and said force producing device supported substantially solely by said support member, said force-producing device positioned between said support member and said platform, said platform having a first end and a second end, a first side and an opposing second side, said platform having a first contact roller cantilevered thereto, said platform having a second contact roller cantilevered thereto, wherein actuation of said force producing device moves said first contact roller and said second contact roller into engagement with the drive member and the drive member into engagement with the conveying rollers.

17. A contact assembly for an accumulation conveyor having first and second spaced apart support rails, at least one cross member between said support rails, a plurality of conveying rollers supported by the support rails, and an endless drive member juxtaposed with the conveying rollers, said contact assembly comprising:

a support member mounted to one of said first support rail, said second support rail and said cross member;

a force-producing device carried by said support member; and a platform positioned between said force-producing device and the conveying rollers, said platform supported by said support member, said platform having a first end and a second end, a first side and an opposing second side, said platform having a first contact roller and a second contact roller, wherein said platform has a first arm attached to said first side and extending beyond said first end and a second arm attached to said second side and extending beyond said second end, said first contact roller cantilevered to said first arm, said second contact roller cantilevered to said second arm, wherein actuation of said force producing device moves said first contact roller and said second contact roller into engagement with the drive member and the drive member into engagement with the conveying rollers.

18. The contact assembly as recited in claim 17, wherein said first arm is attached to a first shaft extending therefrom, said second arm is attached to a second shaft extending therefrom, said first contact roller journaled in said first shaft, said second contact roller journaled in said second shaft, said first shaft and said second shaft extending in opposite directions.

19. The contact assembly as recited in claim 16, wherein said first contact roller has a first end and a second end, said first end and said second end of said first contact roller formed with a flange.

20. The contact assembly as recited in claim 19, wherein said second contact roller has a first end and a second end, said first end and said second end of said second contact roller formed with a flange.

21. The contact assembly as recited in claim 16, wherein said platform has a bottom, said bottom formed with a plate in registration with said force-producing device.

22. The contact assembly as recited in claim 16, wherein said platform has a hexagonal shape.

23. A contact assembly for an accumulation conveyor having first and second spaced apart support rails, at least one cross member between said support rails, a plurality of conveying rollers supported by the support rails, and an endless drive member juxtaposed with the conveying rollers, said contact assembly comprising:

a support member mounted to one of said first support rail, said second support rail and said cross member, wherein said support member has at least one guide member extending therefrom;

a force-producing device carried by said support member; and a platform positioned between said force-producing device and the conveying rollers, said platform supported by said support member, said platform having a first end and a second end, a first side and an opposing second side, said platform having a first contact roller cantilevered thereto, said platform having a second contact roller cantilevered thereto, said platform having at least one post dimensioned to receive said at least one guide member, wherein actuation of said force producing device moves said first contact roller and said second contact roller into engagement with the drive member and the drive member into engagement with the conveying rollers.

24. The contact assembly as recited in claim 16, wherein said platform is formed with at least one cross support.

25. In an accumulation conveyor having first and second spaced apart support rails, at least one cross member between said support rails, a plurality of conveying rollers supported by said support rails, an endless drive member juxtaposed with said conveying rollers, at least one contact assembly positioned along said conveyor, said at least one contact assembly being vertically reciprocal with respect to particular conveying rollers adjacent said at least one contact assembly, said at least one contact assembly comprising:

a support member mounted to one of said first support rail, said second support rail and said cross member, said support member having a cavity formed therein;

a force-producing device carried by said cavity formed in said support member; and a contact member positioned between said force-producing device and the conveying rollers adjacent that contact assembly, said contact member having a pair of cantilevered contact rollers attached thereto, wherein actuation of said force producing member moves said pair of contact rollers into engagement with said drive member and said drive member into engagement with said particular conveying rollers.

26. In an accumulation conveyor having first and second spaced apart support rails, at least one cross member between said support rails, a plurality of conveying rollers supported by said support rails, an endless drive member juxtaposed with said conveying rollers, at least one contact assembly positioned along said conveyor, said at least one contact assembly being vertically reciprocal with respect to particular conveying rollers adjacent said at least one contact assembly, said at least one contact assembly comprising:

a support member mounted to one of said first support rail, said second support rail and said cross member;

a force-producing device carried by one of said support rails; and a contact member positioned between said force-producing device and the conveying rollers adjacent that contact assembly, said contact assembly member having a pair of cantilevered contact rollers attached thereto, wherein said contact assembly further comprises a platform, said platform having a first side and an opposing second side, a first end and a second end, a first arm extending from said first side and beyond said first end, a second arm extending from said second side and beyond said second end, said pair of contact rollers including a first contact roller and a second contact roller, said first contact roller cantilevered to said first arm, said second contact roller cantilevered to said second arm, wherein actuation of said force producing member moves said pair of contact rollers into engagement with said drive member and said drive member into engagement with said particular conveying rollers.

27. The accumulation conveyor as recited in claim 26, wherein said first arm has an end and said second arm has an end, said end of first arm having a first horizontal shaft extending therefrom, said first contact roller journaled in said first horizontal shaft, said end of said second arm having a second horizontal shaft extending therefrom, said second contact roller journaled in said second horizontal shaft, wherein said first shaft and said second shaft extend in opposite directions.

28. The accumulation conveyor as recited in claim 26, wherein said platform further comprises a bottom, said bottom formed with a plate, said plate in registration with said force producing device.

29. The accumulation conveyor as recited in claim 26, wherein said platform has an interior, said interior formed with at least one cross support.

30. The accumulation conveyor as recited in claim 26, wherein said support member has at least one guide member extending therefrom and said platform further comprises at least one post dimensioned to receive said at least one guide member.

31. In an accumulation conveyor having first and second spaced apart support rails, at least one cross member between said support rails, a plurality of conveying rollers supported by said support rails, an endless drive member juxtaposed with said conveying rollers, at least one contact assembly positioned along said conveyor, said at least one contact assembly being vertically reciprocal with respect to particular conveying rollers adjacent said at least one contact assembly, said at least one contact assembly comprising:

a support member mounted to one of said first support rail, said second support rail and said cross member;

a force-producing device carried by one of said support rails;

a contact member positioned between said force-producing device and the conveying rollers adjacent that contact assembly, said contact member having a pair of cantilevered contact rollers attached thereto, wherein actuation of said force producing member moves said pair of contact rollers into engagement with said drive member and said drive member into engagement with said particular conveying rollers; and a pneumatic block mounted to said support member and interconnected with said force-producing device.

32. The accumulation conveyor as recited in claim 25, wherein said support member is mounted to a support rail of said pair of support rails.

33. The accumulation conveyor as recited in claim 25, wherein said pair of contact rollers is a first contact roller and a second contact roller, said first contact roller having a first end and a second end, said first end and said second end of said first contact roller formed with a flange.

34. The accumulation conveyor as recited in claim 33, wherein said second contact roller has a first end and a second end, said first end and said second end of said second contact roller formed with a flange.

35. The accumulation conveyor as recited in claim 25, wherein said support member and said contact member are made of a polymeric material.

36. The accumulation conveyor as recited in claim 25, wherein said support member and said contact member are made of polypropylene having a preselected concentration of glass filler.

37. The accumulation conveyor as recited in claim 26, wherein said platform has a hexagonal shape.

38. The accumulation conveyor as recited in claim 25, where said pair of rollers are made of an acetal resin.

39. An accumulation conveyor, comprising:

first and second spaced apart support rails, at least one cross member between said support rails, a plurality of conveying rollers supported by the support rails, and an endless drive member juxtaposed with the conveying rollers, said endless drive member moving in a direction;

a support member mounted to one of said first support rail, said second support rail and said cross member;

a force-producing device carried by one of said support rails; and a contact member positioned between said force-producing device and the conveying rollers, said contact member vertically reciprocated by said force-producing device, said contact member having a first contact roller and a second contact roller journaled thereto, said first contact roller and said second contact roller substantially aligned in the direction of movement of said endless drive member and journaled in opposite directions, wherein actuation of said force-producing device moves said first contact roller and said second contact roller into engagement with said drive member and said drive member into engagement with said conveying rollers.

40. The accumulation conveyor as recited in claim 39, wherein said first contact roller and said second contact roller are cantilevered to said contact member.

41. An accumulation conveyor, comprising:

first and second spaced apart support rails, at least one cross member between said support rails, a plurality of conveying rollers supported by the support rails, and an endless drive member juxtaposed with the conveying rollers;

a support member mounted to one of said first support rail, said second support rail and said cross member;

a force-producing device carried by one of said support rails; and a contact member positioned between said force-producing device and the conveying rollers, said contact member vertically reciprocated by said force-producing device, said contact member having a first contact roller and a second contact roller journaled thereto, said first contact roller and said second contact roller journaled in opposite directions, wherein said contact member includes a platform, said platform having a first side and an opposing second side, a first end and a second end, a first arm extending from said first side and beyond said first end, a second arm extending from said second side and beyond said second end, said first contact roller cantilevered to said first arm, said second contact roller cantilevered to said second arm, wherein actuation of said force-producing device moves said first contact roller and said second contact roller into engagement with said drive member and said drive member into engagement with said conveying rollers.

42. The accumulation conveyor as recited in claim 41, wherein said first arm has an end and said second arm has an end, said end of first arm having a first horizontal shaft extending therefrom, said first contact roller journaled in said first horizontal shaft, said end of said second arm having a second horizontal shaft extending therefrom, said second contact roller journaled in said second horizontal shaft, said first arm and said second arm extending in opposite directions.

43. The accumulation conveyor as recited in claim 41, wherein said platform further comprises a bottom, said bottom formed with a plate, said plate in registration with said force-producing device.

44. The accumulation conveyor as recited in claim 41, wherein said platform has an interior, said interior formed with at least one cross support.

45. The accumulation conveyor as recited in claim 41, wherein said support member has at least one guide member extending therefrom and said platform further comprises at least one post dimensioned to receive said at least one guide member.

46. The accumulation conveyor as recited in claim 39, wherein said first contact roller has a first end and a second end, said first end and said second end of said first contact roller formed with a flange.

47. The accumulation conveyor as recited in claim 46, wherein said second contact roller has a first end and a second end, said first end and said second end of said second contact roller formed with a flange.

\* \* \* \* \*